(12) United States Patent
Shim et al.

(10) Patent No.: US 7,777,828 B2
(45) Date of Patent: Aug. 17, 2010

(54) INSPECTION APPARATUS FOR LIQUID CRYSTAL DISPLAY PANELS

(75) Inventors: Chang Bo Shim, Paju-si (KR); Jae Min Jong, Paju-si (KR); Bum Soo Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 993 days.

(21) Appl. No.: 11/477,820

(22) Filed: Jun. 30, 2006

(65) Prior Publication Data

US 2007/0154294 A1 Jul. 5, 2007

(30) Foreign Application Priority Data

Dec. 29, 2005 (KR) .................. 10-2005-0133975
Dec. 29, 2005 (KR) .................. 10-2005-0134591

(51) Int. Cl.
    *G02F 1/133* (2006.01)
(52) U.S. Cl. ................ 349/58; 349/192; 414/222.12
(58) Field of Classification Search ........... 414/222.07, 414/222.08, 222.12; 349/58, 192
    See application file for complete search history.

(56) References Cited

U.S. PATENT DOCUMENTS

| | | | |
|---|---|---|---|
| 4,899,105 A | | 2/1990 | Akiyama |
| 5,674,786 A | * | 10/1997 | Turner et al. ............... 438/758 |
| 5,772,835 A | * | 6/1998 | Jordan et al. ............... 156/358 |
| 5,801,545 A | | 9/1998 | Takekoshi et al. |
| 6,353,466 B1 | * | 3/2002 | Park ............................. 349/58 |
| 6,398,610 B1 | * | 6/2002 | Inoue .......................... 445/66 |
| 6,486,927 B1 | | 11/2002 | Kim |
| 7,423,703 B2 | | 9/2008 | Choo |
| 7,442,900 B2 | * | 10/2008 | Inagawa et al. ............. 219/390 |
| 7,450,213 B2 | * | 11/2008 | Kim et al. ................... 349/187 |
| 2002/0153921 A1 | | 10/2002 | Lin |
| 2003/0179341 A1 | * | 9/2003 | Choo .......................... 349/187 |
| 2005/0035311 A1 | * | 2/2005 | Asakawa et al. ........ 250/559.16 |

FOREIGN PATENT DOCUMENTS

| | | |
|---|---|---|
| CN | 1565054 | 1/2005 |
| JP | 07-018323 | 1/1995 |
| JP | 2000-009551 | 1/2000 |
| KR | 10-2001-0070769 A | 7/2001 |

* cited by examiner

*Primary Examiner*—Charles A Fox
(74) *Attorney, Agent, or Firm*—McKenna Long & Aldridge LLP

(57) ABSTRACT

Disclosed herein is an inspection apparatus for liquid crystal display panels, which can perform inspection for orientation abnormality of the liquid crystal display panels while maintaining a uniform temperature. The inspection apparatus comprises a heating chamber to heat a plurality of LCD panels received in a cassette, an inspection unit positioned near the heating chamber to receive the LCD panels heated by the heating chamber, and to inspect abnormality of each LCD panel, and a panel transferring part to withdraw each of the LCD panels from the cassette and supply each of the LCD panels to the inspection unit, and to withdraw each of the LCD panels from the inspection unit and supply each of the LCD panels to the cassette while moving between the cassette and the inspection unit.

19 Claims, 12 Drawing Sheets

INSPECTION APPARATUS FOR LIQUID CRYSTAL DISPLAY PANELS

This application claims the benefit of Korean Patent Application Nos. 10-2005-133975 and 10-2005-134591, filed Dec. 29, 2005, which are hereby incorporated by reference for all purposes as if fully set forth herein. This application incorporates by reference co-pending application Ser. No. 10/184,096, filed on Jun. 28, 2002 entitled "SYSTEM AND METHOD FOR MANUFACTURING LIQUID CRYSTAL DISPLAY DEVICES FROM LARGE MOTHER SUBSTRATE PANELS"; and co-pending application, Ser. No. 11/476,919, filed on Jun. 29, 2006, entitled "METHODS OF MANUFACTURING LIQUID CRYSTAL DISPLAY DEVICES" for all purposes as if fully set forth herein.

BACKGROUND OF THE INVENTION

1. Field of the Invention

The present invention relates to an inspection apparatus for liquid crystal display (LCD) panels, and more particularly, to an inspection apparatus for LCD panels which can rapidly inspect for orientation abnormalities of the LCD panels while maintaining the LCD panels at a uniform temperature.

2. Discussion of the Related Art

The growing popularity of various portable electronic products, such as mobile phones, PDAs, notebook computers, and the like, creates demand for lightweight, compact flat panel display devices. Among flat panel display devices, liquid crystal display (LCD) devices, plasma display panel (PDP) devices, field emission display (FED) devices, vacuum fluorescent display (VFD) devices, and the like have been actively developed. Of these, the LCD device is the most popular due to its mass production capability, simple driving mechanism, high definition-capable picture, and the like.

FIG. 1 is a cross-sectional view illustrating a related art liquid crystal display device, and FIG. 2 is a flow diagram illustrating a related art method for manufacturing a liquid crystal display device.

The LCD device is a device that displays information on a screen using refractivity anisotropy.

A related art LCD device denoted by reference numeral 1 includes an upper substrate 3, a lower substrate 5, and a liquid crystal layer 7 between the upper and lower substrates 3 and 5, as illustrated in FIG. 1.

The lower substrate 5 is a substrate having an array of driving components formed thereon. Although not illustrated in FIG. 1, the lower substrate 5 has a plurality of pixels formed thereon, each of which is formed with a driving component such as a thin film transistor. The upper substrate 3 is a substrate for color filters, and has color filter layers for realizing actual color formed therein. In addition, each of the upper and lower substrates 3 and 5 is formed with a pixel electrode and a common electrode, and coated with an orientation film for orientation of liquid crystal molecules in the liquid crystal layer 7.

The upper and lower substrates 3 and 5 are attached by means of a sealing material 9. The liquid crystal layer 7 is disposed between the upper and lower substrates 3 and 5 such that an amount of light transmitting through the liquid crystal layer is controlled by driving the liquid crystal molecules using the driving components arranged on the lower substrate 5, displaying information.

The method for manufacturing the liquid crystal display device generally comprises a driving component array process to form the driving components on the lower substrate 5, a color filter process for forming the color filters on the upper substrate 3, and a cell process. The method for manufacturing the liquid crystal display device will be described in detail with reference to FIG. 2.

First, in the driving component array process, a plurality of gate lines and data lines are arranged to define pixel regions on the lower substrate 5, and each of the pixel regions is then formed with a thin film transistor, which is a driving component connected to the gate lines and the data lines (S101). In addition, a pixel electrode is also formed to connect with the thin film transistor by the driving component array process, such that, when a signal is applied to the pixel electrode via the thin film transistor, the pixel electrode drives the liquid crystal layer.

Subsequently, a common electrode, and color filter layers of R, G and B for exhibiting colors are formed on the upper substrate 3 by the color filter process (S104).

After applying orientation films to the upper and lower substrates 3 and 5, the orientation films are rubbed to supply an orientation regulating force or surface securing force (that is, a pre-tilt angle and orientation) to the liquid crystal molecules in the liquid crystal layer formed between the upper and lower substrates 3 and 5 (S102, S105).

Next, after spacers for maintaining a constant cell gap are scattered on the lower substrate 5, and a sealing material 9 is applied to an outer periphery of the upper substrate 3, the upper and lower substrates 3 and 5 are attached to each other by pressing them together (S103, S106, S107).

Each of the upper and lower substrates 3 and 5 is generally formed of a large size glass substrate. As a result, with the color filter layers and the TFT as the driving component formed in each panel region, a plurality of panel regions are formed on a single large size glass substrate. Thus, it is necessary to cut and process the glass substrate (S108). After the liquid crystal layer is formed by injecting liquid crystals into each processed liquid crystal display panel through a liquid crystal injection port and the liquid crystal injection port is sealed, each liquid crystal display panel is inspected (S109, S110), thus completing manufacturing of the LCD panels.

Inspection of the liquid crystal display panels can be typically divided into appearance inspection, electrical lighting inspection, and orientation abnormality inspection.

The lighting inspection is performed in such a way as to determine whether various electrical components are operating normally by applying a signal to a completed liquid crystal display panel, verifying the results. The appearance inspection is performed in such a way as to determine whether the liquid crystal display panel has an imperfection by inspecting the liquid crystal display panel with naked eyes of an operator. In addition, the orientation abnormality inspection is performed in such a way as to determine whether liquid crystals are gathering or pooling in a lower portion of the liquid crystal display panel that is sagging under its own weight.

The orientation abnormality of liquid crystals is caused by an undesired increase in volume of the liquid crystal layer resulting from the temperature of the liquid crystal layer within the liquid crystal display panel being too high when manufacturing the liquid crystal display panel. This causes the cell gap of the liquid crystal display panel to exceed the height afforded by the spacer. Accordingly, liquid crystals move to the lower portion of the liquid crystal display panel as it sags, making the cell gap become non-uniform, and thereby deteriorating the quality of the liquid crystal display device.

The orientation abnormality inspection is typically performed by observing an image at the lower portion of the liquid crystal display panel with the naked eyes of the operator while light is transmitted through the liquid crystal display panel. That is, if any abnormality is detected in the image during an observation of the lower portion of the liquid crystal display panel, it is determined that there is orientation abnormality in the liquid crystal display panel.

That is, the orientation abnormality inspection is performed in a state in which the completed liquid crystal display panel is maintained at high temperatures. To this end, the orientation abnormality inspection is performed after each liquid crystal display panel is heated in a heating chamber. Heating of the liquid crystal display panels is typically performed in cassettes for inspection efficiency. In other words, after a plurality of liquid crystal display panels are received in a cassette, they are heated to a high temperature in a heating chamber. The heated liquid crystal display panels are conveyed to an inspection apparatus by means of an additional conveying means, and then subjected to the inspection.

However, such a related art inspecting apparatus for detecting orientation abnormality of the LCD panels has a problem in that, because the inspection apparatus is located a predetermined distance away from the heating chamber, the liquid crystal display panels are exposed to surrounding air and are cooled during conveyance to the inspection apparatus after being transferred from the cassette of the heating chamber, thereby making it impossible to perform a precise inspection.

In addition, the related art orientation abnormality inspecting apparatus has a problem in that, because the interior of the heating chamber is exposed to surrounding air while the liquid crystal display panels are transferred from the cassette of the heating chamber, the surrounding air is induced into the heating chamber, causing a non-uniform temperature of the heating chamber.

Furthermore, because the related art orientation abnormality inspecting apparatus requires expensive mechanisms, including a robot for conveying the liquid crystal display panels from the heating chamber to the inspector, manufacturing costs are invariably increased, and a lot of time is required to convey the liquid crystal display panels.

SUMMARY OF THE INVENTION

Accordingly, the present invention is directed to an inspection apparatus for liquid crystal display panels that substantially obviates one or more problems due to limitations and disadvantages of the related art.

An advantage of the present invention is to provide an inspection apparatus for liquid crystal display panels, which can perform inspection for orientation abnormality of liquid crystal display panels while maintaining a heating chamber at a uniform temperature and preventing a temperature of the liquid crystal display panels heated to a high temperature by the heating chamber from being lowered, enabling inspection of the orientation abnormality to be always precisely performed, and which comprises a conveyer for supplying a cassette to the heating chamber such that the conveyer is disposed at the same angle as that of the cassette mounted at a predetermined angle in the heating chamber, thereby reducing manufacturing costs of the heating chamber and a space of the heating chamber.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an inspection apparatus for liquid crystal display panels, comprising: a heating chamber to heat a plurality of LCD panels received in a cassette; an inspection unit positioned near the heating chamber to receive the LCD panels heated by the heating chamber and to inspect abnormality of each LCD panel; a panel transferring part to withdraw each of the LCD panels from the cassette and supply each of the LCD panels to the inspection unit, and to withdraw each of the LCD panels from the inspection unit and supply each of the LCD panels to the cassette while moving between the cassette and the inspection unit.

The inspection apparatus may further include a conveying part to convey the cassette to/from the heating chamber.

The conveying part may be positioned on a slant to convey the cassette to/from the heating chamber.

The panel transferring part may include a hand member constructed to selectively clamp each LCD panel and having an upper end exposed to an upper outside of the heating chamber, a forward and backward shifting member to move the hand member in forward and backward directions of the heating chamber, and a lifting member having one end secured to the forward and backward shifting member and the other end to lift or lower the hand member in upward and downward directions.

At this time, the forward and backward shifting member may include a first rail installed on an upper surface of the heating chamber in the forward and backward directions, and a first activating member having one end installed to move in the forward and backward directions while being supported by the first rail, and the other end secured to the lifting member.

The lifting member may include a second rail installed in the upward and downward directions in the heating chamber, and a second activating member having one end installed to move in the upward and downward directions while being supported by the second rail, and the other end secured to the hand member.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to embodiments of the present invention, examples of which are illustrated in the accompanying drawings. Wherever possible, the same reference numbers will be used throughout the drawings to refer to the same or like parts.

Figure 1:
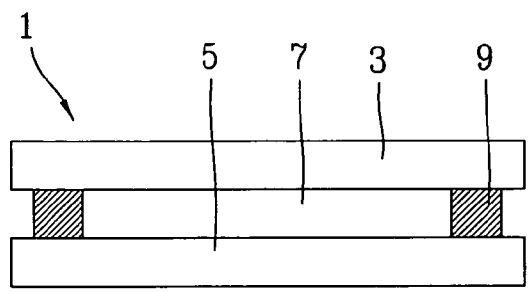
FIG. 1 is a cross-sectional view illustrating a related art liquid crystal display device.
Figure 2:
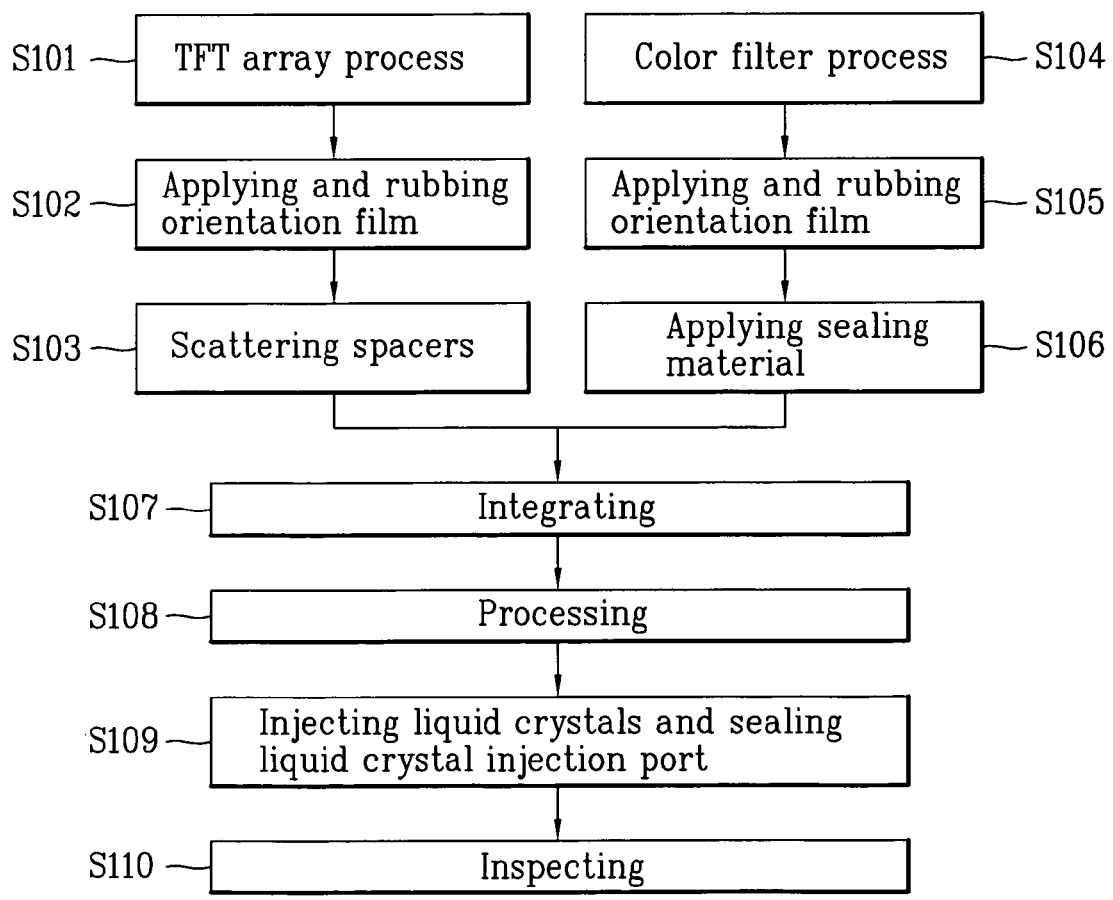
FIG. 2 is a flow diagram illustrating a method for manufacturing the related art liquid crystal display device.
Figure 3:
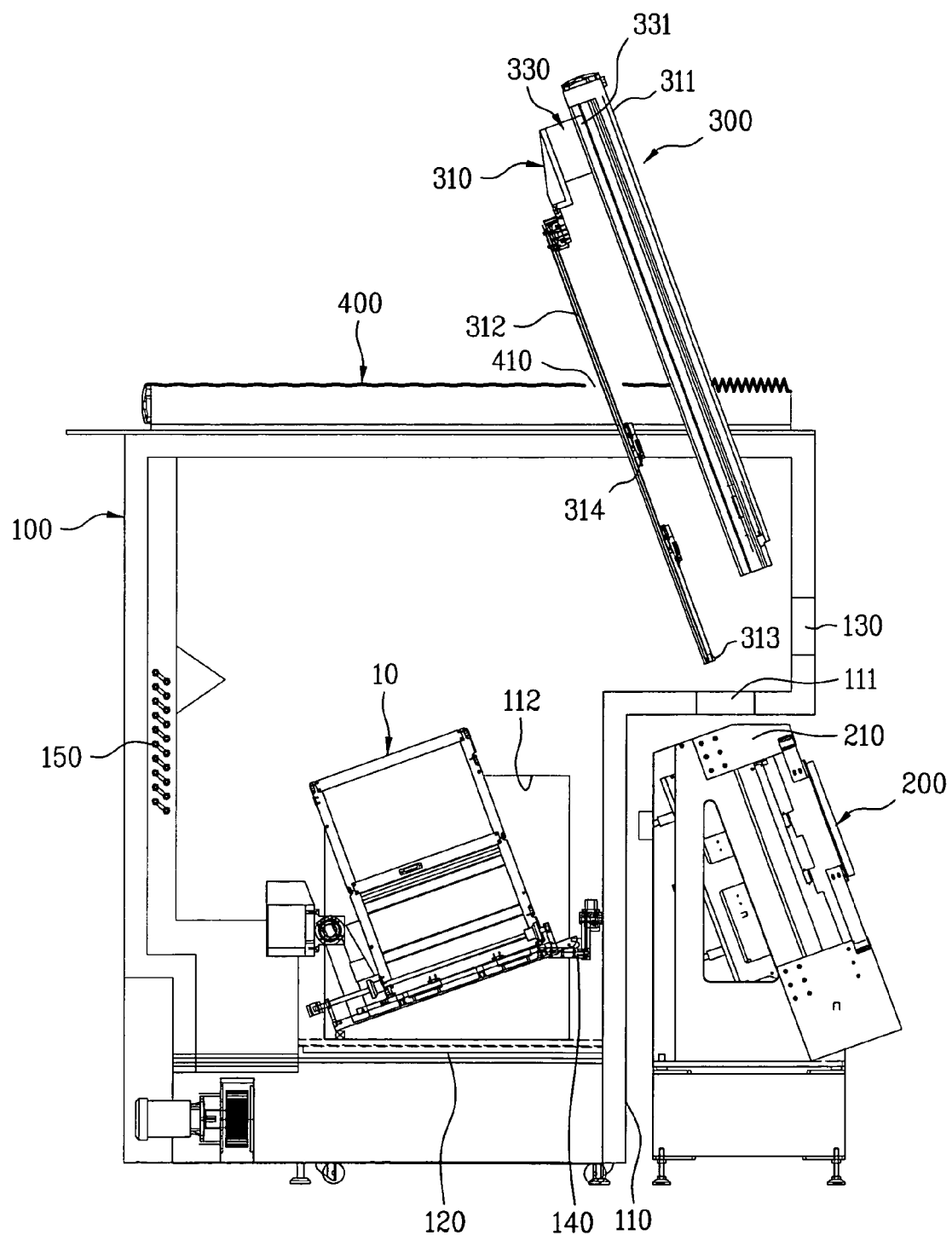
FIG. 3 is a side view schematically illustrating the internal structure of an inspection apparatus for liquid crystal display panels in accordance with one embodiment of the present invention.
Figure 4:
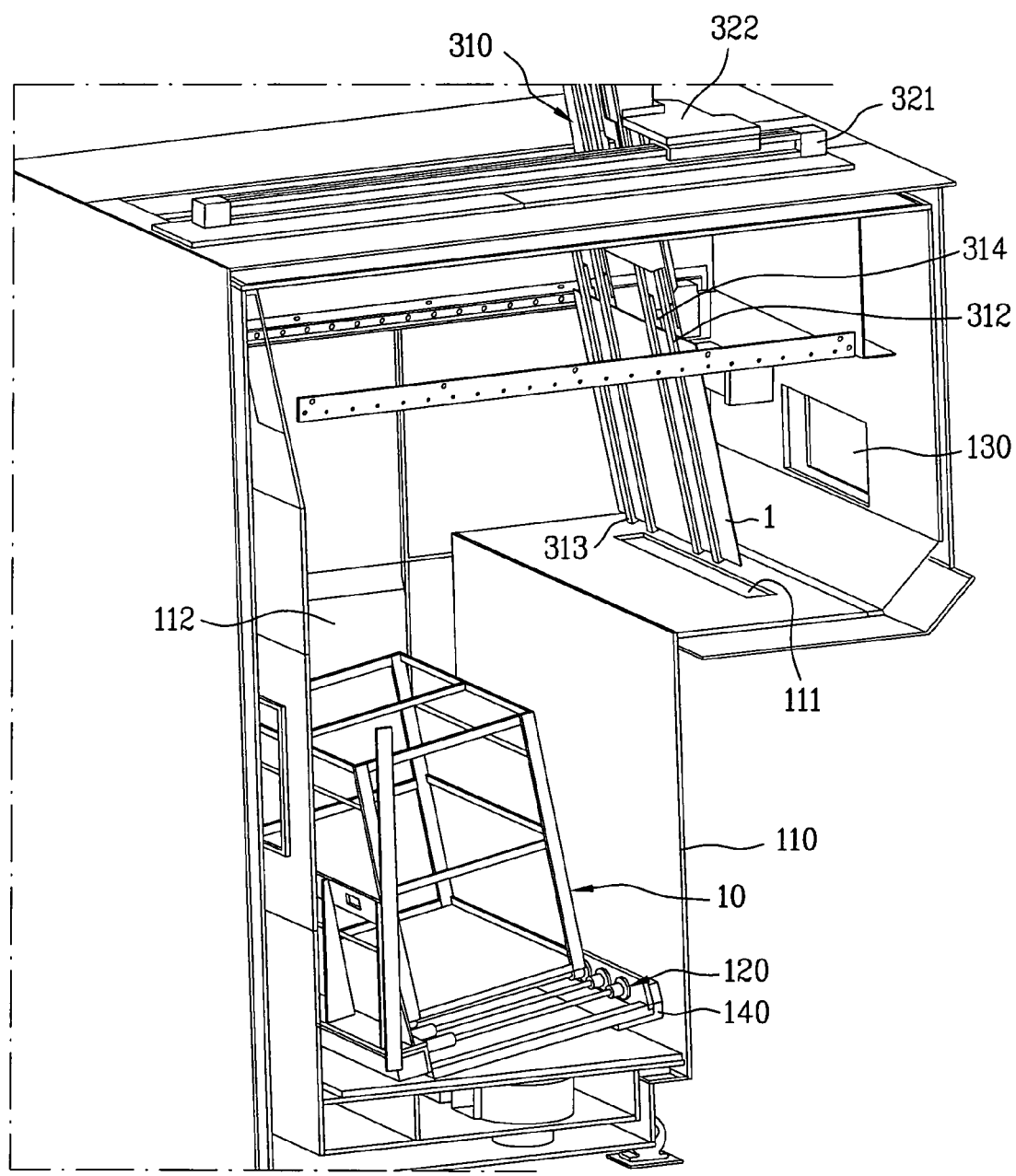
FIG. 4 is a perspective view illustrating main components of the internal structure of the inspection apparatus for the liquid crystal display panels in accordance with the embodiment of the present invention.

FIG. 3 is a side view schematically illustrating the internal structure of an inspection apparatus for liquid crystal display panels in accordance with one embodiment of the present invention. FIG. 4 is a perspective view illustrating main components of the internal structure of the inspection apparatus for liquid crystal display panels in accordance with the embodiment of the present invention.

Referring to FIG. 3, the inspection apparatus for liquid crystal display panels according to the embodiment generally comprises a heating chamber 100, an inspection unit 200, and a panel transferring part 300.

Each of the components will be described in detail below.

Referring to FIGS. 3 and 4, the heating chamber 100 receives a cassette 10 having a plurality of liquid crystal display panels (not illustrated) stacked therein. The heating chamber 100 has a substantially box-shaped internal structure, and is adapted to receive the cassette 10 at a rear side therein. The heating chamber 100 heats the LCD panels to a preset temperature.

The heating chamber 100 illustrated in FIG. 3 has a recess 110 formed at a lower portion of a front side thereof such that the inspection unit 200 is placed in the recess 110. It is understood that other embodiments of the invention are contemplated and covered in which the heating chamber does not have such a recess.

Returning to FIG. 3, the recess 110 is formed at an upper surface thereof with a panel entrance 111 through which each LCD panel enters the heating chamber 100. Here, the panel entrance 111 has such a size as to allow the LCD panel to smoothly pass therethrough.

In most cases, the panel entrance 111 is provided with a door (not illustrated) to selectively open and close the panel entrance 111. The door is provided for the purpose of maintaining the heating chamber 100 in a closed state, excluding when opening the heating chamber.

The heating chamber 100 is further formed at a rear lateral side with a cassette entrance 112 through which the cassette 10 is conveyed to and from the heating chamber 100. The heating chamber 100 is further provided on a bottom surface of the rear lateral side with a conveying part 120 which conveys the cassette 10 to and from the heating chamber 100 through the cassette entrance 112. Of course, the cassette entrance 112 may be provided with a door (not illustrated) to selectively open and close the cassette entrance 112. At this point, the door may be adapted to close the cassette entrance 112 excluding a part where the conveying part 120 is installed.

Although it may have various structures, the conveying part 120 will be described as a conveyor in this embodiment.

The heating chamber 100 may be formed at an upper surface of a front side with a window 130 through which an operator can observe activity within the heating chamber 100.

The heating chamber 100 is provided with a heater 150 to heat the LCD panels received in the cassette 10. The heater 150 may be installed in an internal space of the heating chamber 100. However, it should be noted that the present invention is not limited to this structure, and that the heater 150 may be installed in a wall of the heating chamber 100.

Of course, although not illustrated in the drawings, the heater 150 may be installed independently of the heating chamber 100 such that hot air flows from the separate heater 150 into the heating chamber 100 through a duct and the like.

The inspection unit 200 is a component to receive each LCD panel heated by the heating chamber 100, and to inspect orientation abnormality of the LCD panel. The inspection unit 200 is positioned in the recess 110 of the heating chamber 100. The inspection unit 200 has an inlet port 210 formed to face the panel entrance 111 of the heating chamber 100 such that the LCD panel withdrawn from the heating chamber 100 is directly input to the inspection unit 200.

Figure 5:
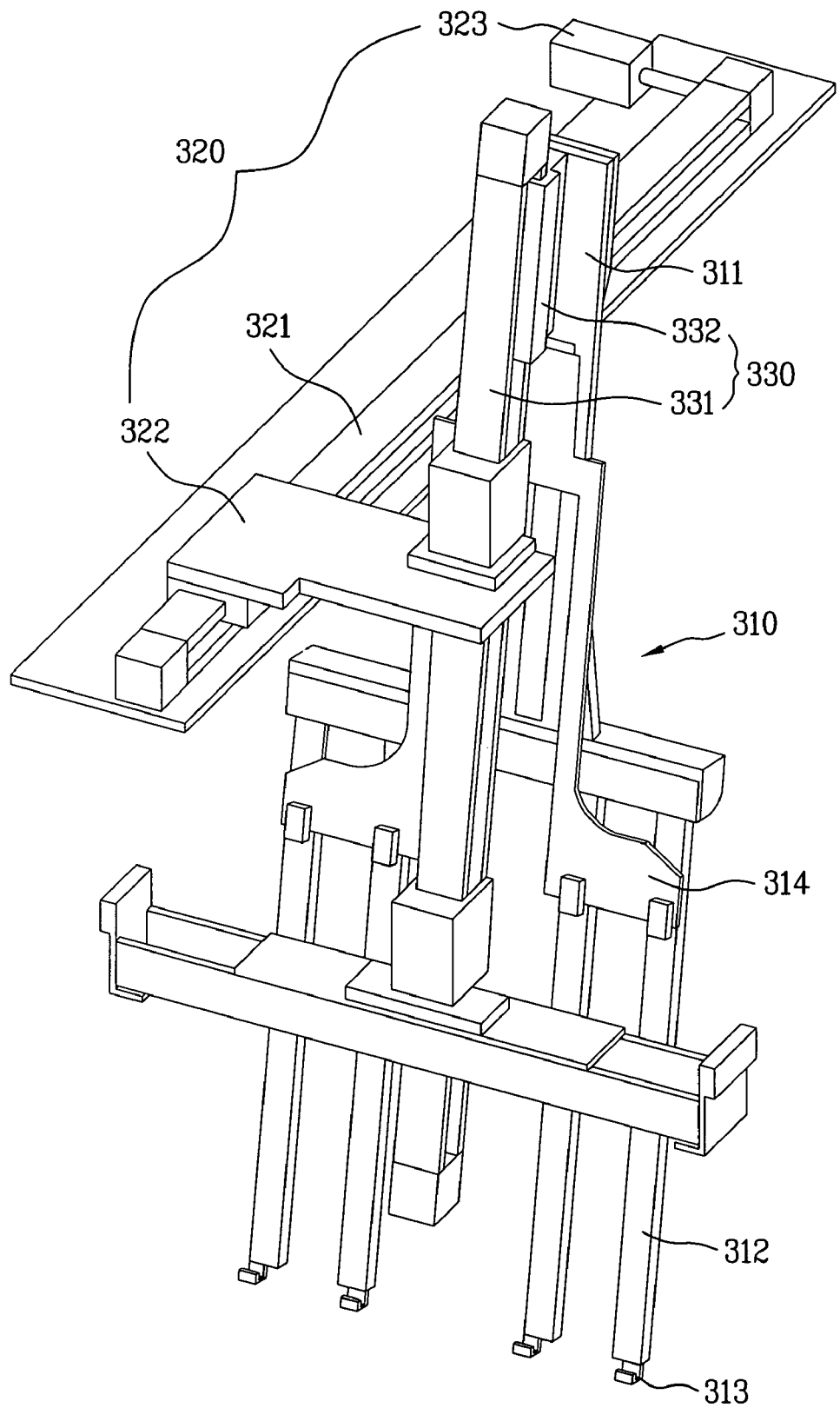
FIG. 5 is a perspective view illustrating a panel transferring part of the inspection apparatus for the liquid crystal display panels in accordance with the embodiment of the present invention.
Figure 6:
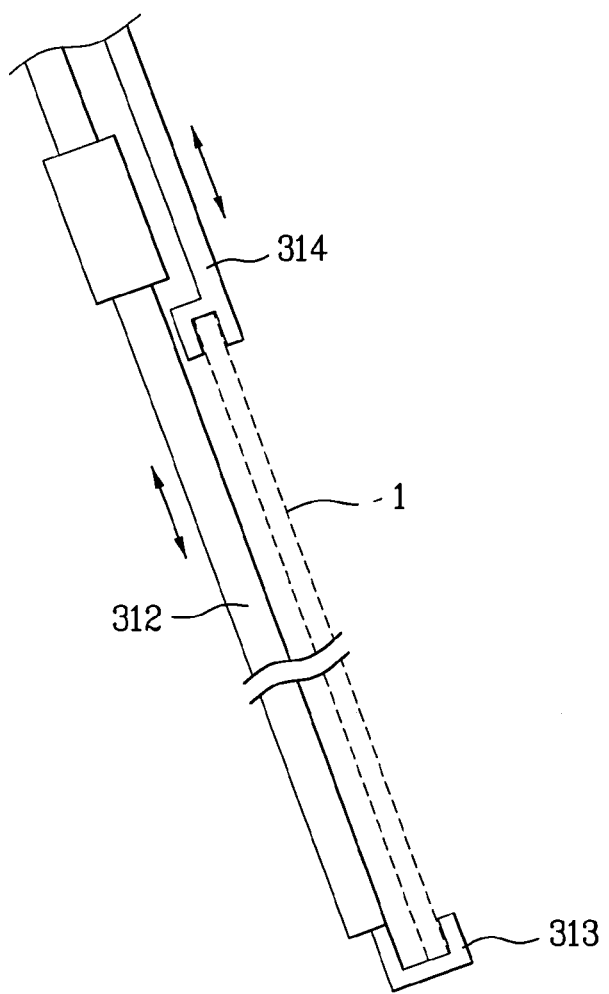
FIG. 6 is a side view illustrating main components of the inspection apparatus for the liquid crystal display panels in accordance with the embodiment of the present invention in which the liquid crystal display panel is clamped by a clamping part and a lifting member of the inspection apparatus.

FIG. 5 is a perspective view illustrating a panel transferring part of the inspection apparatus for the liquid crystal display panels according to the embodiment, and FIG. 6 is a side view illustrating the transferring part of the inspection apparatus, which clamps the LCD panels.

The panel transferring part 300 is a component to withdraw each LCD panel from the cassette 10 in the heating chamber 100 and supply the LCD panel to the inspection unit 200 through the panel entrance 111.

That is, as illustrated in FIG. 5, the panel transferring part 300 comprises a hand member 310, a forward and backward shifting member 320, and a lifting member 330.

The hand member 310 comprises a body 311, and a plurality of fingers 312. The body 311 has an upper end exposed to an upper outside of the heating chamber 100. Here, a distal end of each finger 312 is formed with a clamping portion 313 to selectively clamp each LCD panel 1. The clamping portion 313 may be formed of TEFLON resin or other similar resin materials in order to resist scratches from being created on the surface of the LCD panel 1.

In particular, as illustrated in FIG. 6, the clamping portion 313 has multiple bent structures, one of which is illustrated in FIG. 6) which is bent forward or backward, and then bent upward so as to clamp a lower portion of each LCD panel 1. Although not illustrated in the drawings, the clamping portion 313 may have a separate step formed on an inner surface thereof (which contacts the LCD panel) to prevent the LCD panel 1 clamped by the clamping portion 313 from moving.

In addition, the hand member 310 may be provided with a lifting clamp 314 which clamps an upper portion of the LCD panel 1, as illustrated in FIGS. 5 and 6. The lifting clamp 314 is configured to clamp an upper periphery of the LCD panel 1 while selectively raising or lowering along the hand member 310, and serves to prevent movement of the LCD panel during conveyance of the LCD panel 1. At this point, although not illustrated in the drawings, the lifting clamp 314 may be configured to be lifted or lowered by a driving mechanism such as a step motor, an actuator, and the like.

The forward and backward shifting member 320 is configured to shift the body 311 of the hand member 310 in forward and backward directions of the heating chamber 100, and comprises a first rail 321 and a first activating member 322.

The first rail 321 is installed along a hypothetical axis in the forward and backward directions on an upper surface of the heating chamber 100, and the first activating member 322 has one end installed to move in the forward and backward directions while being supported by the first rail 321, and the other end secured to a second rail 331 of a lifting member 330 as described below. Here, a step motor 323 is used to provide movement of the first activating member 322. Of course, an actuator may be used instead of the step motor.

The lifting member 330 is configured to move the body 311 of the hand member 310 in upward and downward directions of the heating chamber 100, and comprises the second rail 331 and a second activating member 332.

The second rail 331 is installed in the upward and downward directions in the heating chamber 100, and coupled to the first activating member 322 which constitutes the forward and backward shifting member 320. That is, the second rail 331 moves along with the first activating member 322 in the forward and backward directions of the heating chamber 100.

In addition, the second activating member 332 has one end installed to move in the upward and downward directions while being supported by the second rail 331, and the other end secured to an upper end of the body 311 of the hand member 310. Here, a step motor (not illustrated) is used for a component for movement of the second activating member 332. Of course, an actuator may be used instead of the step motor.

It is desirable that the inspection unit 200 and the hand member 310 constituting the inspection apparatus for the LCD panels according to the embodiment of the present invention be installed slanted or tilted at a predetermined angle such that the cassette 10 faces the front side of the heating chamber 100 as the front side of the cassette 10 is lowered towards the heating chamber 100 while being conveyed thereinto. This is because inspection is performed by the inspection unit 200 with each LCD panel slanted at a predetermined angle θ therein. In other words, this structure is provided to supply the LCD panel to the inspection unit 200 at the angle θ which is required for the inspection.

The cassette 10 may be configured to be slanted by itself. Alternatively, as illustrated in the drawings, the cassette 10 may be selectively slanted by means of an additional lift 140 which is configured to lift a front side of the conveying part 120 (right side in the drawing). In addition, although not illustrated in the drawings, the cassette 10 may be selectively slanted by means of the lift 140 which is configured to directly lift the front side of the cassette 10 instead of the conveying part 120.

In this case, not only are the costs of manufacturing the lift are increased, but also a space required by the heating chamber 100 is also increased due to the space needed to install the lift, thus increasing installation costs.

According to present invention, the conveying part 120 may be slanted by itself to allow the cassette 10 to be slanted at the predetermined angle θ. Such a slant of the conveying part 120 is not accomplished only within the heating chamber 100. If the cassette 10 having the completed LCD panels 1 received therein is not slanted, but supplied to the heating chamber 100 in a horizontal state with respect to the ground, it is necessary to slant the cassette 10 at the predetermined angel θ before being mounted in the heating chamber 100, which requires additional lifting. Accordingly, it is most preferable that the cassette 10 be conveyed in a slanted state at the predetermined angle θ from an initial conveying stage of the cassette 10.

Figure 7:
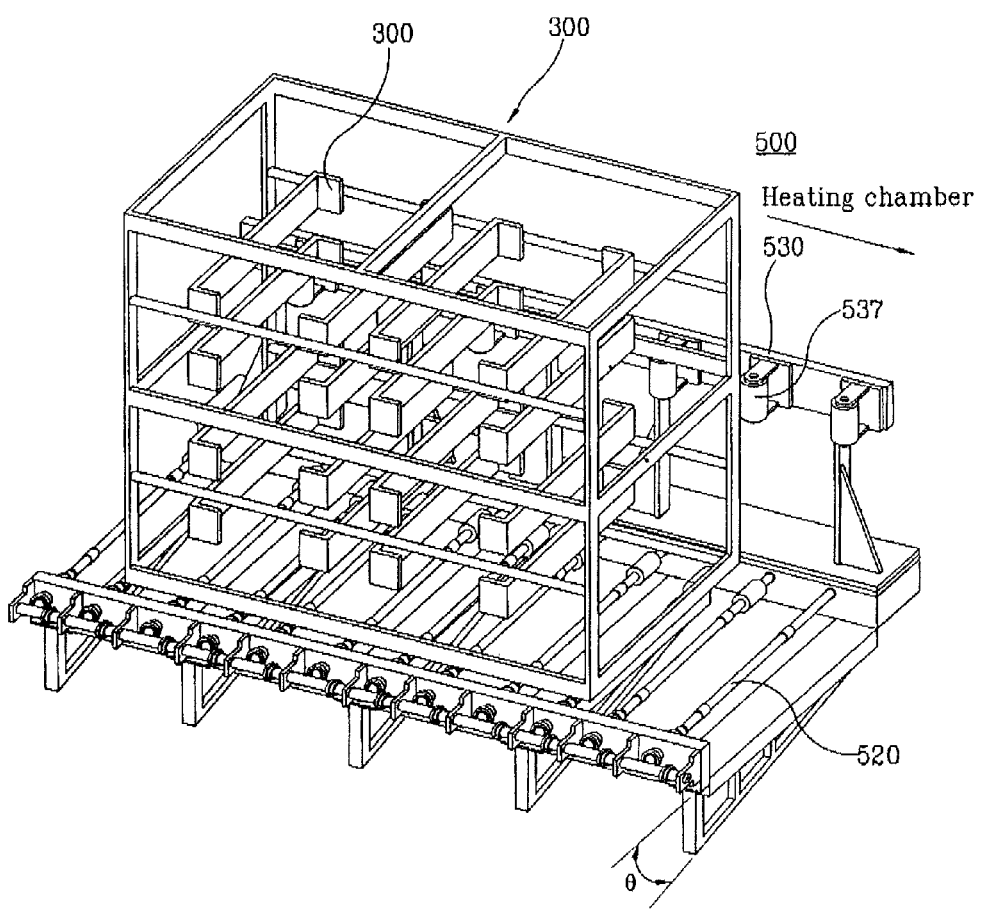
FIG. 7 is a structural view illustrating another conveying part (conveyer) of an inspection apparatus for the liquid crystal display panels in accordance with the embodiment of the present invention.

FIG. 7 is a structural view illustrating another conveying part (conveyer) of the inspection apparatus for the liquid crystal display panels in accordance with the embodiment of the present invention. Specifically, FIG. 7 illustrates a conveyor 500 which conveys the cassette 10 having the LCD panels (temporarily stored after completing the manufacturing processes) received therein to the heating chamber 100.

As illustrated in FIG. 7, the conveyer 500 comprises a plurality of rollers 520 to convey the cassette 10 having the LCD panels 1 received therein while rotating, a side support 530 to support the cassette 10 and which is installed at a side to which the cassette 10 on the rollers 520 is slanted, and a guide roller 532 rotatably provided to the side support 530 so as to contact the side of the cassette 10.

The side support 530 is installed at one side below the conveyor 500 having the rollers 520, and slants the rollers 520 at a predetermined angle θ. In this manner, the rollers 520 are slanted thereby, and thus, the cassette 10 on the rollers 520 is also slanted. In addition, due to the slant of the cassette 10, the LCD panels 1 secured to a panel securing part 511 formed in the cassette 10 are also slanted at the predetermined angle θ.

Although the guide roller 532 is rotatable, the guide roller 532 is not rotated by an external driving means such as a motor, but by application of external force thereto. Accordingly, a rotation speed of the guide roller 532 is the same as a moving speed of the cassette 10, thereby preventing the slanted cassette 10 from being impacted by friction with the side support 530 while moving on the conveyor.

Such a conveyor constructed as described above extends from a previous processing apparatus or a physical distribution apparatus to the heating chamber 100 so that the cassette 10 having the LCD panels 1 received therein is conveyed in a slanted state to the heating chamber 100, and mounted therein.

In addition, according to the embodiment, the inspection apparatus for the LCD panels may further comprise a closing part 400, as illustrated in FIG. 3.

The closing part 400 is configured to ensure a space through which the hand member 310 moves, while closing the opening on the upper surface of the heating chamber 100. That is, the closing part 400 enables the interior of the heating chamber 100 to be in a closed state, thereby preventing the temperature of the heating chamber from varying due to exposure to the surrounding air.

The closing part 400 has a foldable curtain shape. In addition, the closing part 400 has both ends secured to an upper front side and an upper rear side of the heating chamber 100, respectively, and an inner surface surrounding a peripheral surface of the body 311 constituting the hand member 310.

When respective fingers 312 of the hand member 310 are configured to be exposed to the outside of the heating chamber 100, the closing part 400 may be formed with an additional entrance 410 which enables the respective fingers 312 to pass therethrough.

A method for inspecting orientation abnormality of LCD panels using the inspection apparatus according to the embodiment will be described below.

FIGS. 8A to 8F are diagrams schematically illustrating a series of procedures to inspect the liquid crystal panels using the inspection apparatus according to the embodiment of the present invention.

Figure 8A:
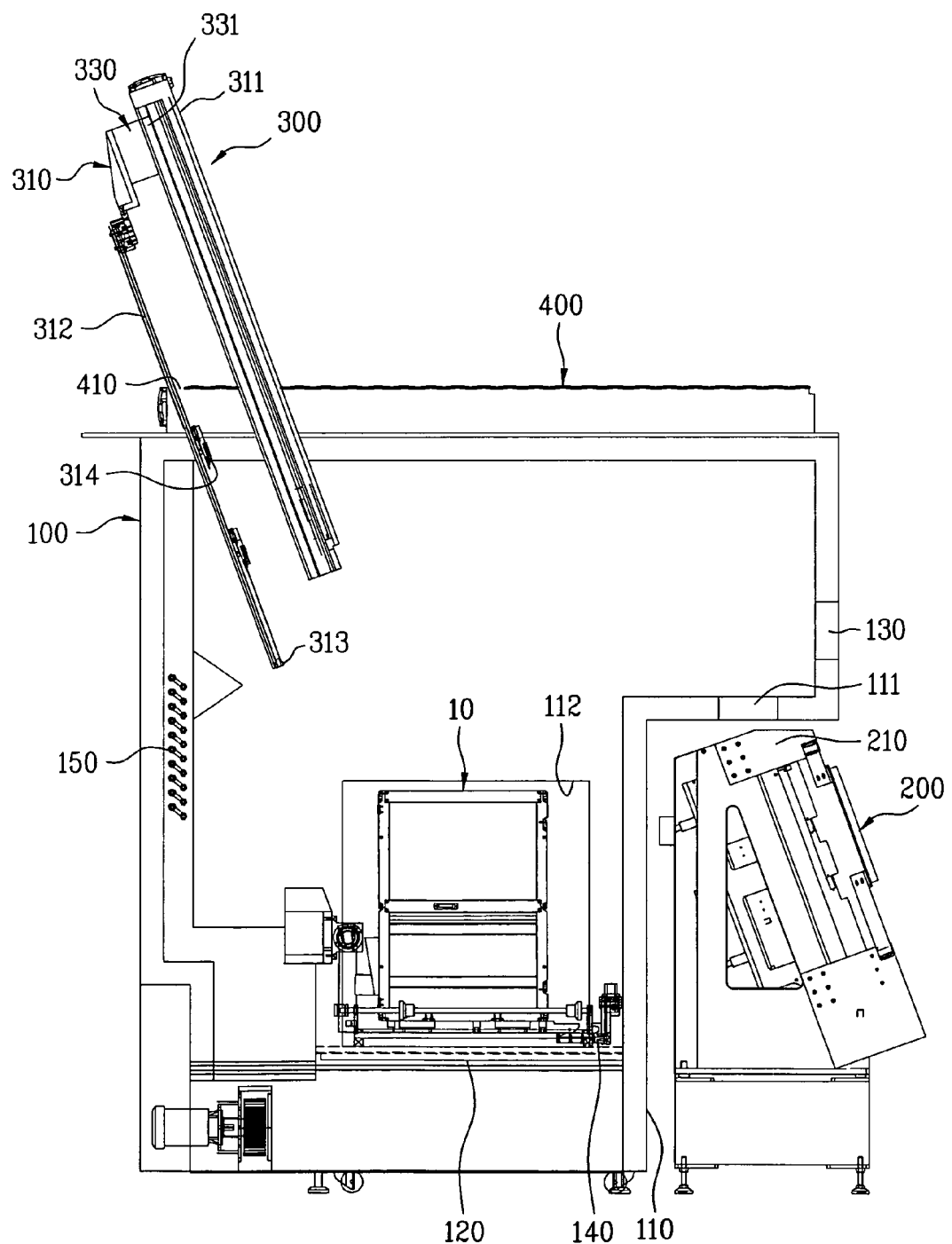
FIGS. 8A to 8F are diagrams schematically illustrating a series of procedures to inspect liquid crystal display panels using the inspection apparatus in accordance with the embodiment of the present invention.

First, as illustrated in FIG. 8A, the cassette 10 having plural LCD panels 1 stacked therein is conveyed into the heating chamber 100 via the conveying part 120. At this time, the door (not illustrated) of the heating chamber 100 is operated to open the cassette entrance 112.

After the cassette 10 is mounted in the heating chamber 100 as described above, the cassette entrance 112 is closed via operation of the door.

Figure 8B:
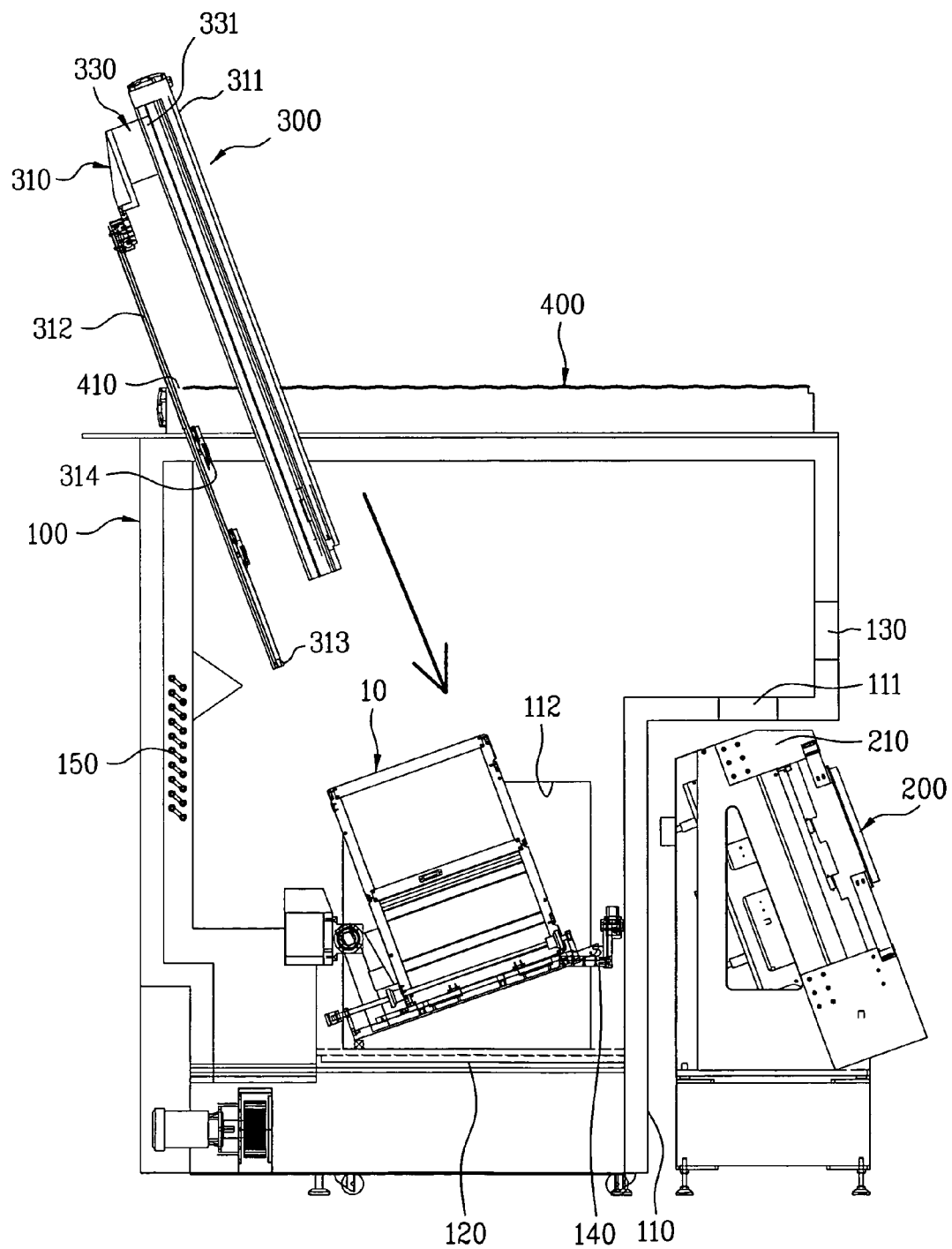

As illustrated in FIG. 8B, the front side of the cassette 10 is slanted more than the rear side thereof by operation of the lift 140. At this time, a slanted angle of the cassette 10 is the same as that of the panel transferring part 300 and/or that of the inspection unit 200.

If the conveying part 120 is embodied as a conveyor 500 inclined at a predetermined angle θ as illustrated in FIG. 7, the step as illustrated in FIG. 8B is not required. In other words, the cassette 10 having the plural LCD panels 1 stacked therein is conveyed into and mounted in the heating chamber 100 through the conveyor 500 described in FIG. 7 while being inclined at the predetermined angle θ.

Then, as the heater 150 is operated to heat the heating chamber 100 to a preset temperature (for example, about 50~70° C.).

Figure 8C:
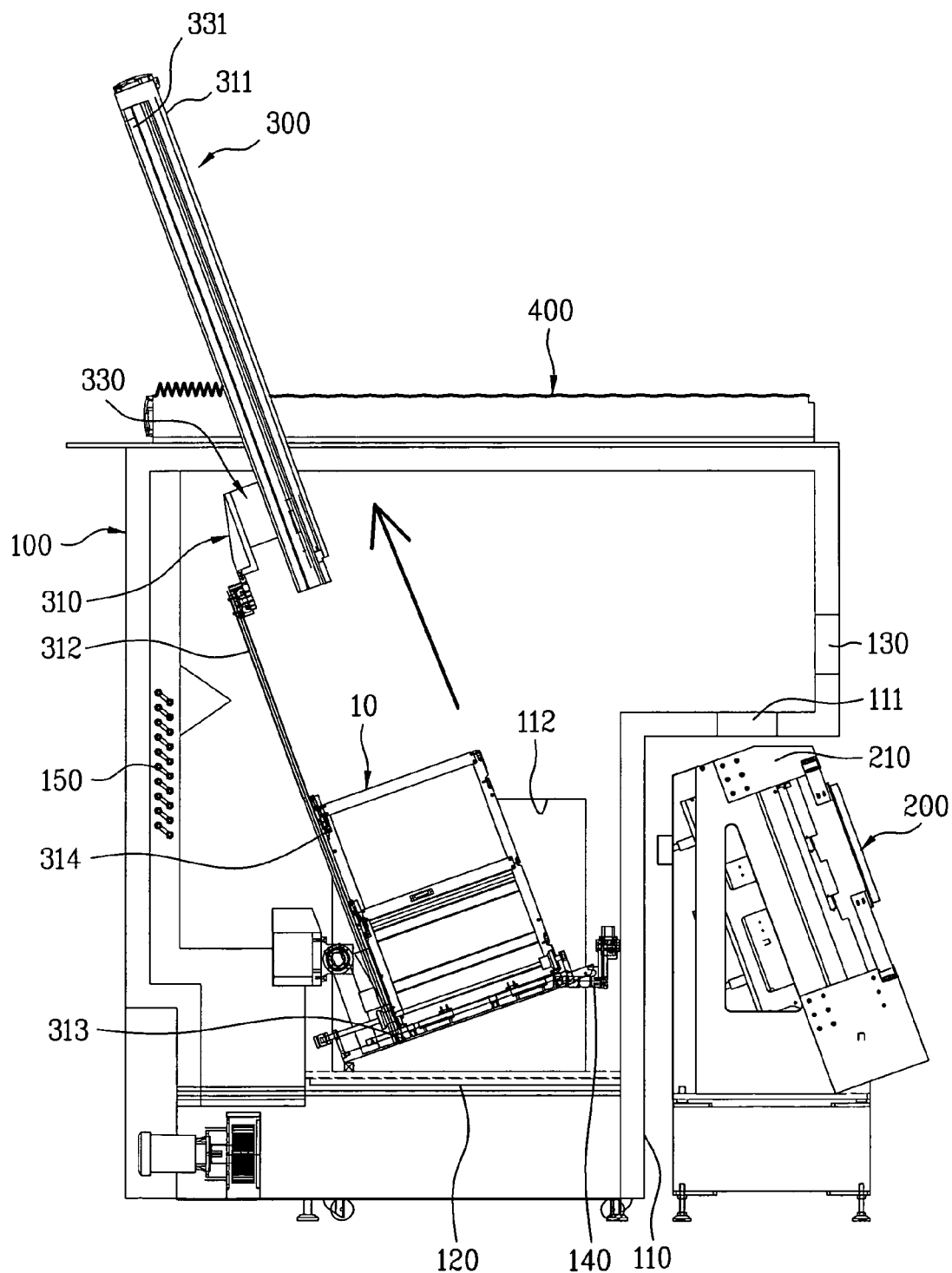

As illustrated in FIG. 8C, when the respective LCD panels 1 received in the cassette 100 reach the predetermined temperature in the heating chamber 100 by the series of procedures as described above, the panel transferring part 300 is driven.

That is, the first activating member 322 constituting the forward and backward shifting member 320 is operated to allow the hand member 310 to be placed at a level of an LCD panel (while will hereinafter be referred to as "object panel") desired to be withdrawn at an upper portion of the cassette 10 as illustrated in FIG. 8C, and the second activating member 332 is operated to lower the fingers 312 of the hand member 310 to a location where the respective fingers 312 can withdraw the object panel 1 within the cassette 10.

Next, the first activating member 322 is operated to allow the respective fingers 312 to support the rear side of the object panel 1 while allowing the lower portion of the object panel 1 to be positioned to face the clamping portion 313 formed at the distal end of each finger 312.

In addition, in the above state, when the respective fingers 312 of the hand member 310 are lifted by the second activating part 332, the object panel 1 is withdrawn from the cassette 10 in the state wherein the lower portion of the object panel 1 is clamped by the clamping portions 313, and, at the same time, the rear side of the object panel 1 is slanted to the respective panel 312.

Figure 8D:
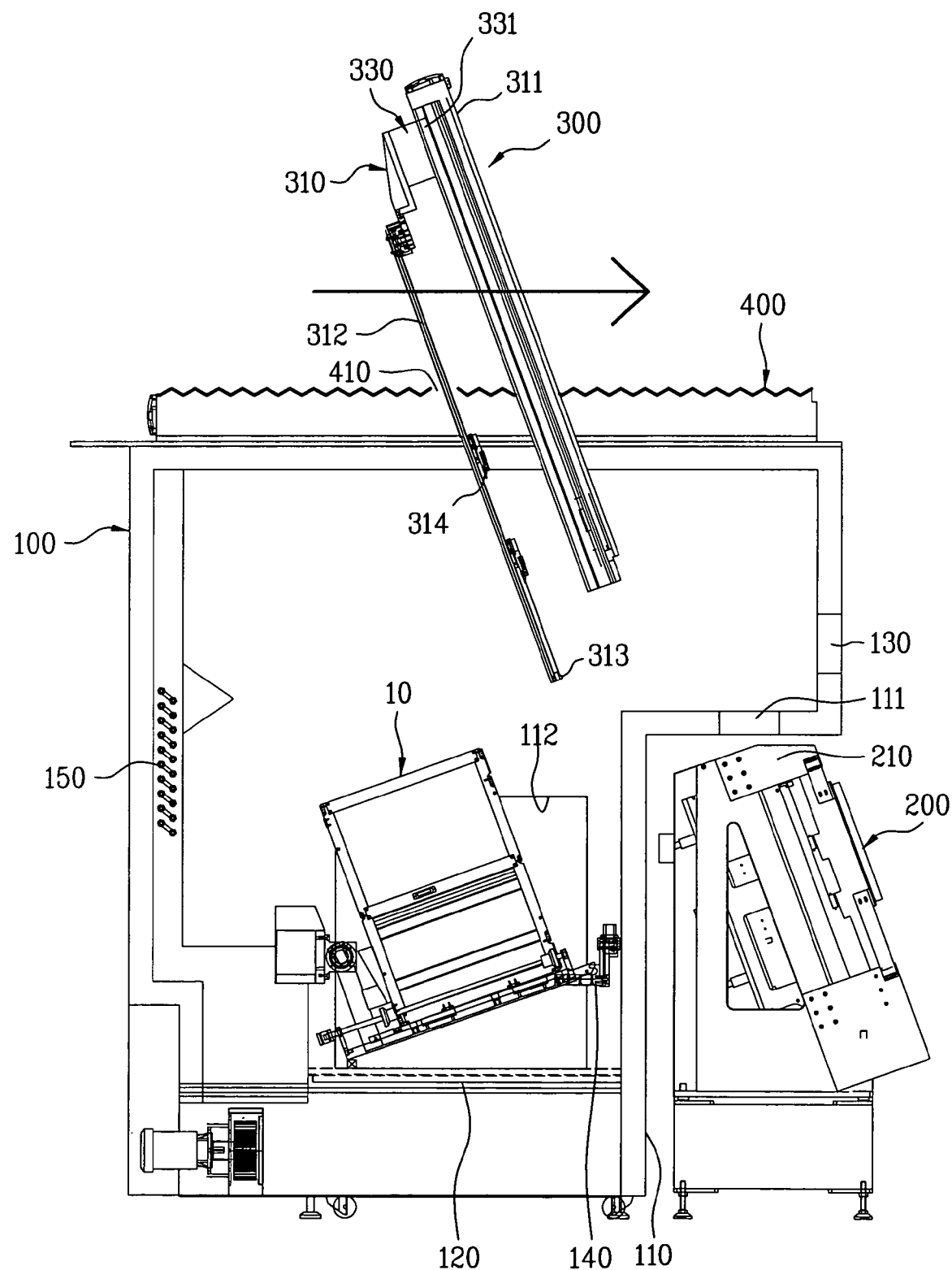

After the object panel 1 is withdrawn, the hand member 310 is lifted to a height where the hand member 310 is not intervened by the cassette 10, and is then moved to a location facing the panel entrance 111 of the heating chamber 100 by the first activating part 322, as illustrated in FIG. 8D.

Figure 8E:
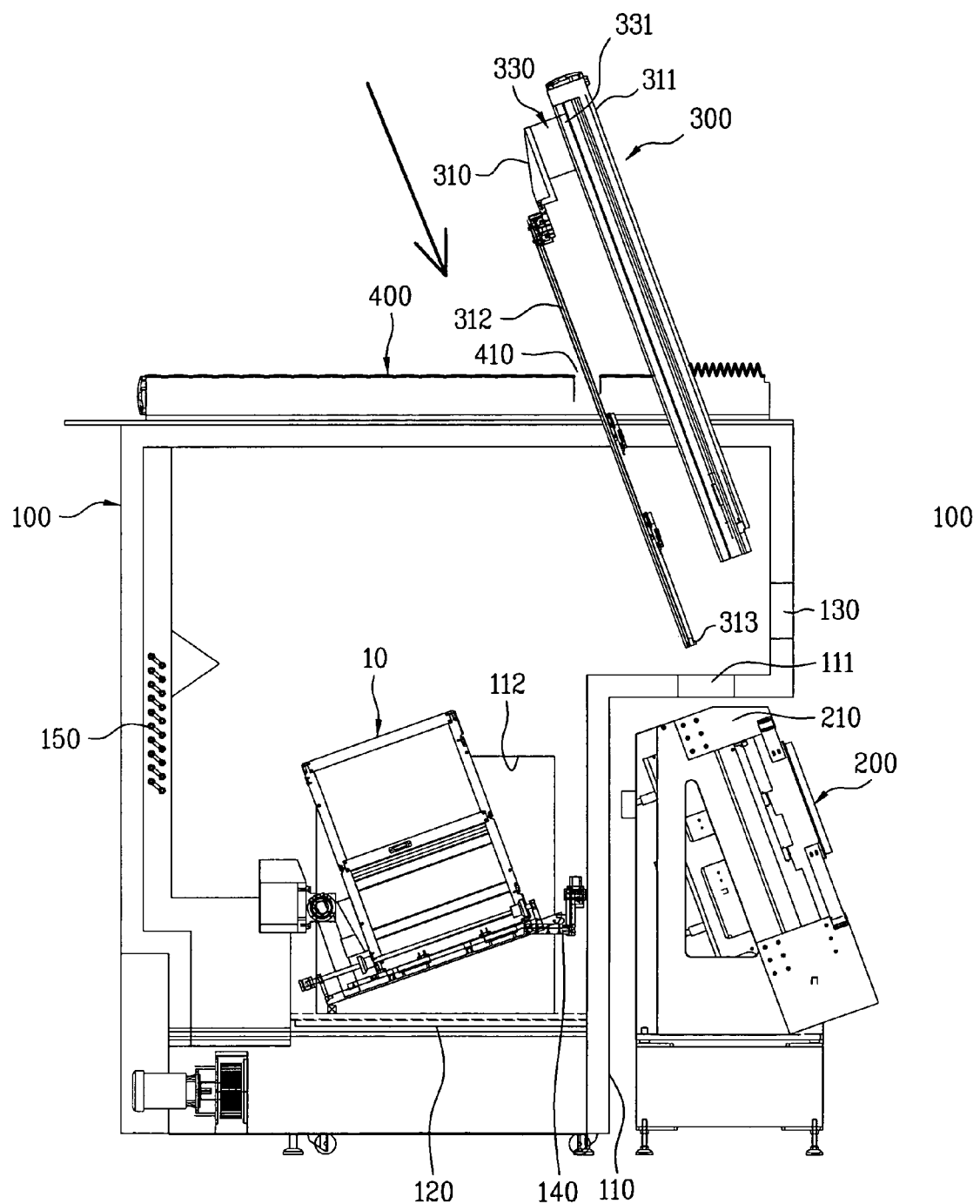
Figure 8F:
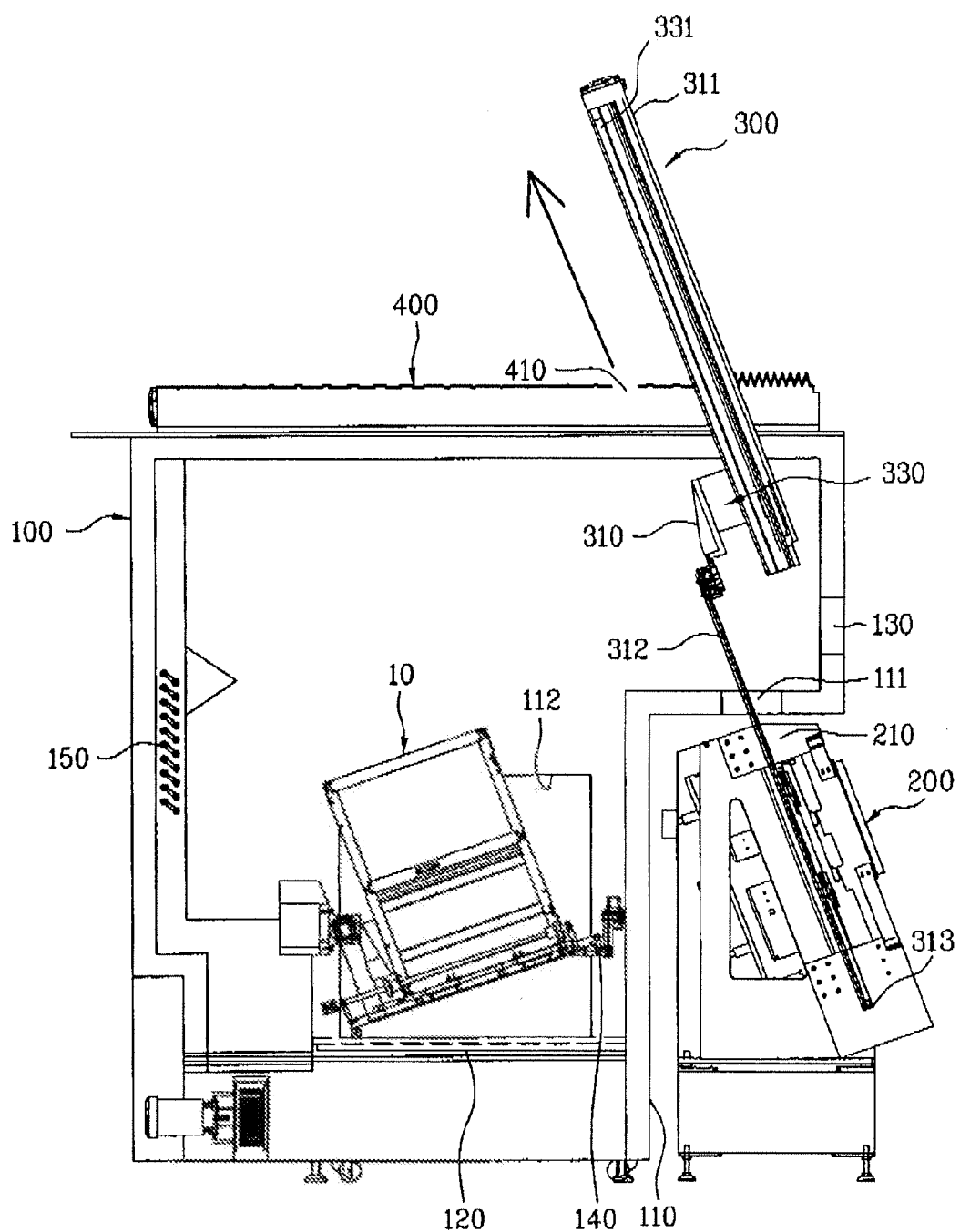

Then, as illustrated in FIGS. 8E and 8F, the hand member 310 is lowered by the second activating part 332, and thus the respective fingers 312 and the object panel 1 loaded on the fingers 312 move to the inspection unit 200 through the panel entrance 111.

The inspection unit 200 secures only the object panel 1, and the respective fingers 312 are withdrawn through the panel entrance 111 by sequential operations of the first activating part 322 and the second activating part 332 with the object panel 1 remaining in the inspection unit 200.

Then, inspection for orientation abnormality of the object panel 1 is performed in the inspection unit 200. Then, after completing the inspection, the object panel 1 is withdrawn from the inspection unit 200, and then mounted again in the cassette 10 in reverse of the procedures described above.

These series of procedures are consecutively performed until every LCD panel 1 received in the cassette 10 is completely inspected.

If the inspection for all the LCD panels 1 received in the cassette 10 is completed, the cassette entrance 112 is opened, allowing the cassette 10 to be conveyed from the heating chamber while allowing another cassette (having plural LCD panels as objects for abnormality inspection) to be conveyed into the heating chamber, so that the inspection procedures are performed again as described above.

As apparent from the above description, the inspection apparatus for the LCD panels according to the invention allows the procedure of transferring the LCD panels from the cassette to the inspection unit to be performed within the heating chamber in the closed state.

Accordingly, the inspection apparatus of the present invention has an advantageous effect in that variation in temperature of the LCD panels is minimized, thereby enabling inspection for abnormality of the LCD panels to be accurately performed.

In addition, the inspection apparatus of the present invention has another advantageous effect in that variation in temperature of the heating chamber is minimized.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An inspection apparatus for liquid crystal display (LCD) panels, comprising:
   a heating chamber to heat a plurality of LCD panels received in a cassette;
   an inspection unit positioned near the heating chamber to receive the LCD panels heated by the heating chamber and to inspect abnormality of each LCD panel; and
   a panel transferring part to withdraw each of the LCD panels from the cassette and supply each of the LCD panels to the inspection unit, and to withdraw each of the LCD panels from the inspection unit and supply each of the LCD panels to the cassette while moving between the cassette and the inspection unit,
   wherein said panel transferring part is within the heating chamber, and wherein the heating chamber comprises a recess formed at a lower portion of a front side thereof such that the inspection unit is placed at the lower portion of the front side thereof, and a panel entrance formed on an upper surface of the recess to supply the LCD panels to the inspection unit therethrough.

2. The inspection apparatus according to claim 1, wherein the panel entrance is provided with a door to selectively open or close the panel entrance.

3. The inspection apparatus according to claim 1, wherein the inspection unit has a panel inlet formed to face the panel entrance.

4. The inspection apparatus according to claim 1, wherein the heating chamber is formed at a lateral rear side with a cassette entrance to allow the cassette to be conveyed into and from the heating chamber therethrough.

5. The inspection apparatus according to claim 4, wherein the cassette entrance is provided with a door to selectively open or close the cassette entrance.

6. The inspection apparatus according to claim 4, wherein the heating chamber is further provided at a bottom surface of the lateral rear side with a conveying part to allow the cassette to be conveyed into and from the heating chamber along the bottom surface of the rear side through the cassette entrance.

7. The inspection apparatus according to claim 6, wherein the conveying part comprises a conveyor.

8. The inspection apparatus according to claim 6, further comprising: a lift to raise the front side of the cassette so as to allow the cassette to be selectively slanted.

9. The inspection apparatus according to claim 6, wherein the conveying part is installed to convey the cassette at a slant into/from the heating chamber.

10. The inspection apparatus according to claim 1, wherein the heating chamber comprises a window to allow procedures of inspection within the heating chamber to be observed therethrough.

11. The inspection apparatus according to claim 10, wherein the window is formed on an upper surface of the front side of the heating chamber.

12. The inspection apparatus according to claim 1, wherein the panel transferring part comprises a hand member configured to selectively clamp each LCD panel and having an upper end exposed to an upper outside of the heating chamber, a forward and backward shifting member to move the hand member between the cassette and the inspection unit, and a lifting member having one end secured to the forward and backward shifting member, and the other end to lift or lower the hand member in upward and downward directions.

13. The inspection apparatus according to claim 12, wherein the hand member has a clamping portion formed at a lower distal end thereof to clamp a lower portion of the LCD panel.

14. The inspection apparatus according to claim 12, wherein the forward and backward shifting member comprises a first rail installed on an upper surface of the heating chamber in the forward and backward directions, and a first activating member having one end installed to move in the forward and backward directions while being supported by the first rail, and the other end secured to the lifting member.

15. The inspection apparatus according to claim 12, wherein the lifting member comprises a second rail installed in the upward and downward directions in the heating chamber, and a second activating member having one end installed to move in the upward and downward directions while being supported by the second rail, and the other end secured to the hand member.

16. The inspection apparatus according to claim 12, wherein the heating chamber has an opening formed on an upper surface thereof to allow the hand member to move therethrough, and a closing part to close the opening.

17. The inspection apparatus according to claim 16, wherein the closing part has a foldable curtain shape, and has both ends secured to an upper front side and an upper rear side of the heating chamber, respectively, and an inner surface surrounding a peripheral surface of the hand member.

18. The inspection apparatus according to claim 1, wherein the cassette, the inspection unit, and the panel transferring part are installed at predetermined angles, respectively.

19. The inspection apparatus according to claim 18, wherein the cassette, the inspection unit, and the panel transferring part are installed at the same angle to the ground.

* * * * *